(No Model.)  4 Sheets—Sheet 1.

P. P. OLSSON.
STRAIGHT KNITTING MACHINE.

No. 452,018. Patented May 12, 1891.

Witnesses:
J. Staib
Chas. H. Smith

Inventor:
Per Persson Olsson
per Lemuel W. Serrell Atty (No Model.) 4 Sheets—Sheet 2.
P. P. OLSSON.
STRAIGHT KNITTING MACHINE.
No. 452,018. Patented May 12, 1891.
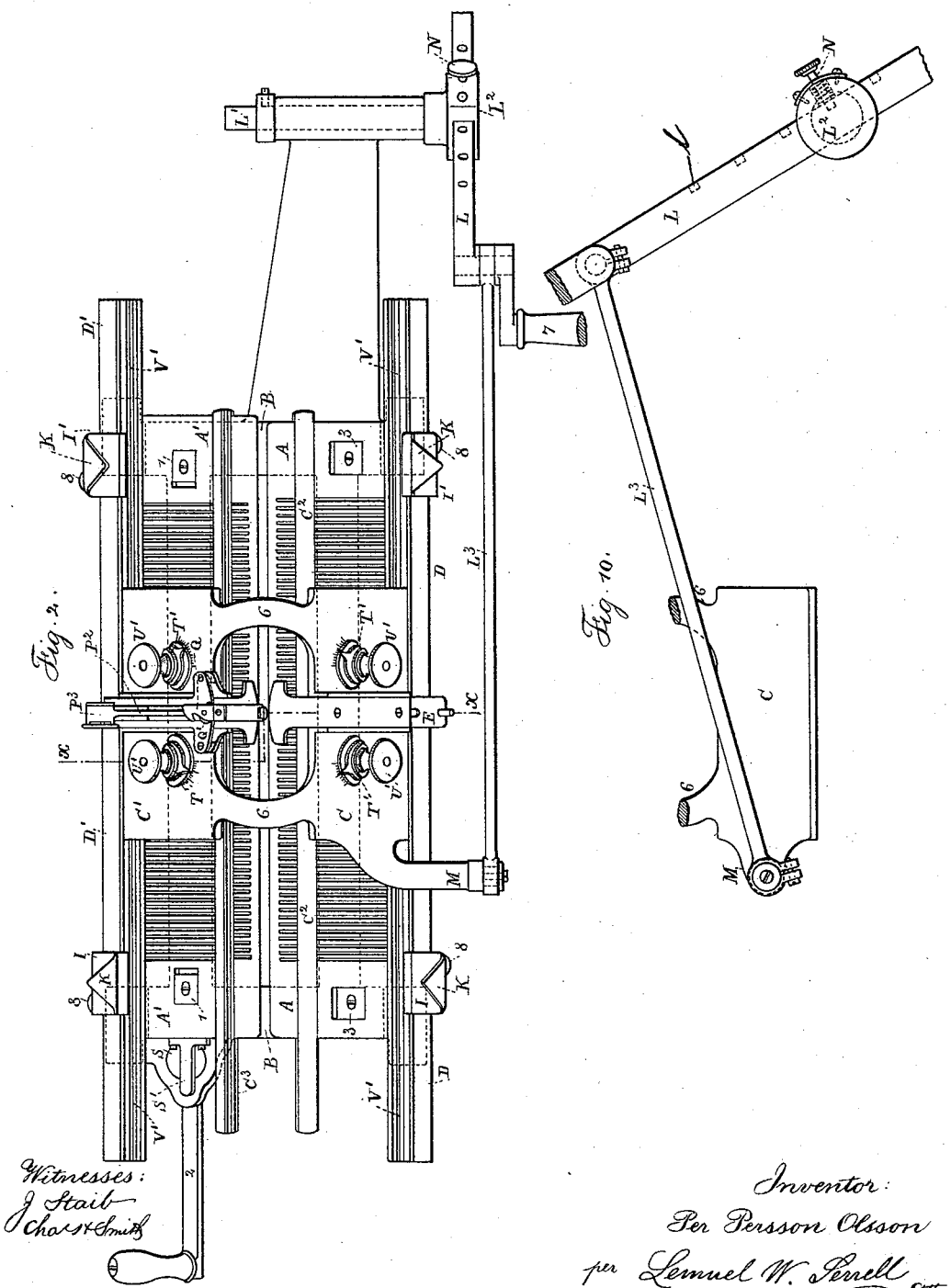
Witnesses:
J. Staib
Chas. H. Smith
Inventor:
Per Persson Olsson
per Lemuel W. Serrell
Atty.

(No Model.) 4 Sheets—Sheet 3.
P. P. OLSSON.
STRAIGHT KNITTING MACHINE.
No. 452,018. Patented May 12, 1891.
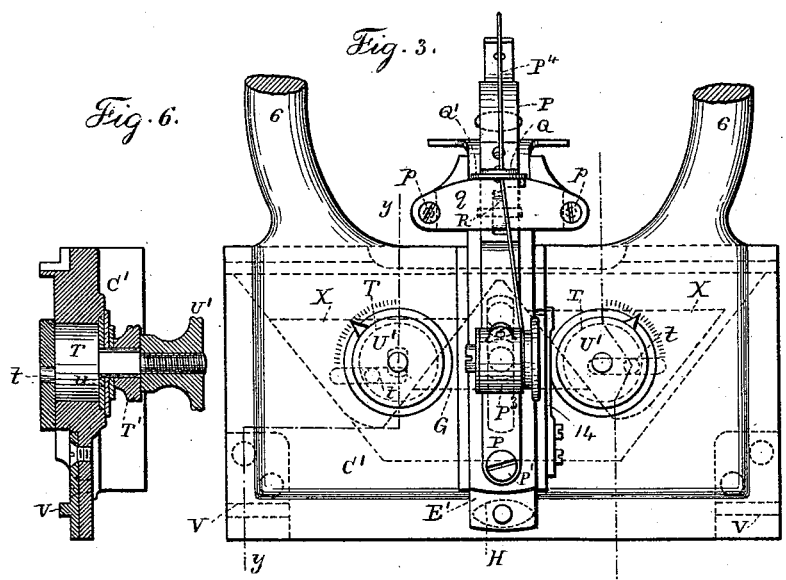
Witnesses:
J. Staib
Chas. H. Smith
Inventor:
Per Persson Olsson
per Lemuel W. Serrell atty.

(No Model.) 4 Sheets—Sheet 4.
P. P. OLSSON.
STRAIGHT KNITTING MACHINE.
No. 452,018. Patented May 12, 1891.
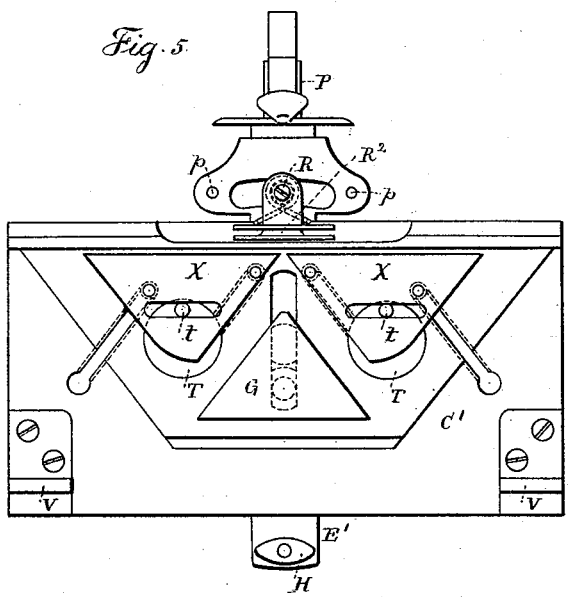
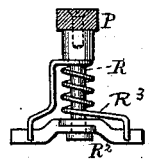
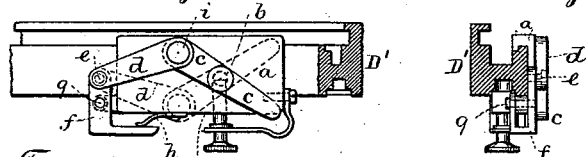
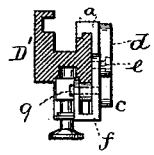
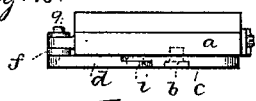
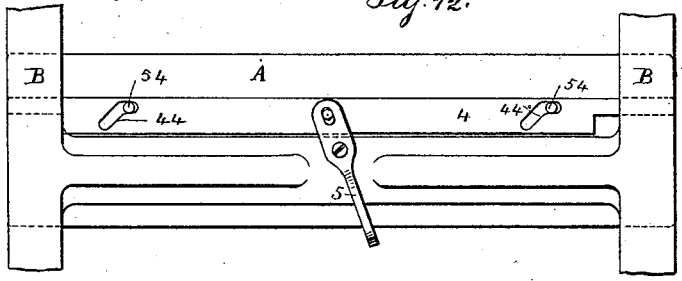
Witnesses:
J. Staib
Chas H. Smith
Inventor:
Per Persson Olsson
per Lemuel W. Serrell
atty.

UNITED STATES PATENT OFFICE.

PER PERSSON OLSSON, OF STOCKHOLM, SWEDEN.

STRAIGHT-KNITTING MACHINE.

SPECIFICATION forming part of Letters Patent No. 452,018, dated May 12, 1891.

Application filed April 13, 1888. Serial No. 270,512. (No model.) Patented in Sweden October 22, 1887, Nos. 1,533 and 1,538; in England February 27, 1888, No. 2,930; in France February 29, 1888, No. 189,038; in Belgium March 2, 1888, No. 80,850; in Germany March 3, 1888, Nos. 46,013 and 47,742; in Norway March 6, 1888, Nos. 930 and 937; in Austria-Hungary June 7, 1888, No. 10,281, and No. 23,176, and in Denmark February 12, 1889.

*To all whom it may concern:*

Be it known that I, PER PERSSON OLSSON, of Stockholm, in the Kingdom of Sweden, have invented an Improvement in Straight-Knitting Machines, of which the following is a specification.

The present invention relates to the knitting-machine ordinarily known as the "Lamb knitting-machine;" and the improvements relate to the details of construction and combinations of parts hereinafter set forth.

Letters Patent for this invention have been granted to me in Great Britain, dated February 27, 1888, No 2,930; in Belgium, dated March 2, 1888, No. 80,850; in France, dated February 29, 1888, No. 189,038; in Austria-Hungary, dated June 7, 1888, No. 10,281 and No. 23,176; in Germany, dated March 3, 1888, Nos. 46,013 and 47,742; in Norway, dated March 6, 1888, Nos. 930 and 937; in Denmark, dated February 12, 1889, and in Sweden, dated October 22, 1887, Nos. 1,533 and 1,538.

Figure 1:
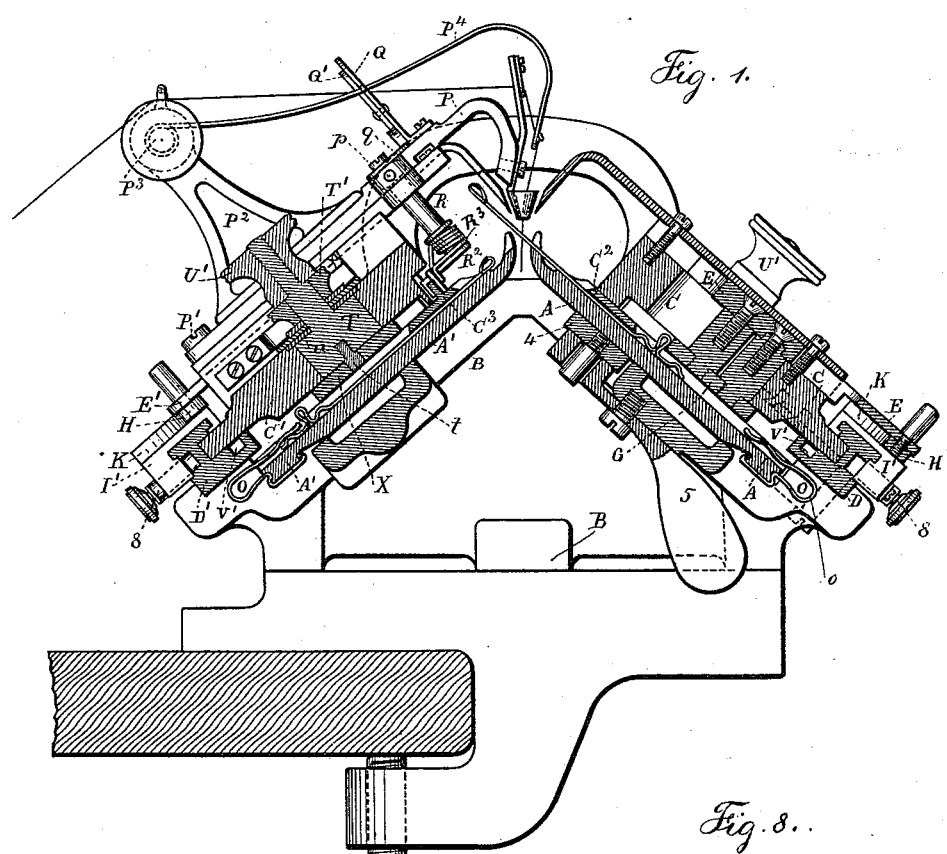
Figure 8:
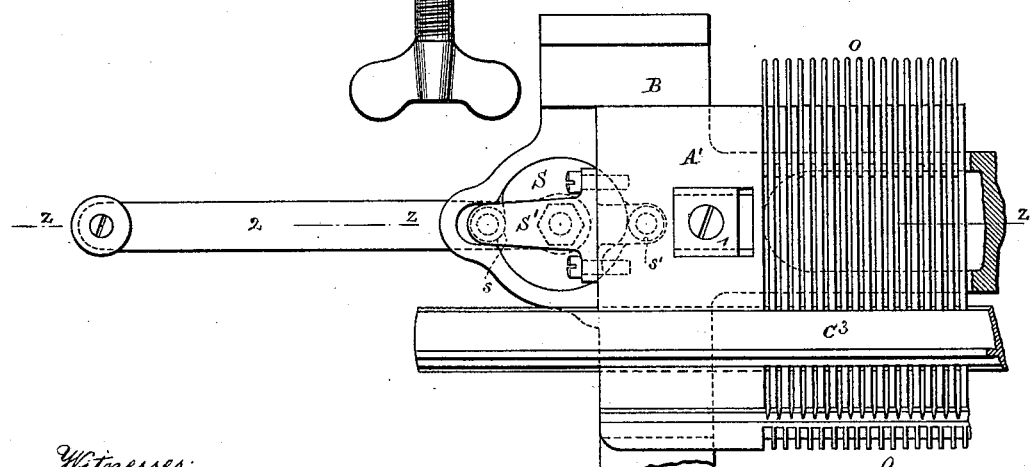

In the drawings, Figure 1 is a cross-section of the knitting-machine at the line $xx$, Fig. 2. Fig. 2 is a general plan of the machine in smaller size. Fig. 3 is a view of the rear plate of the carriage perpendicular to its surface. Fig. 4 is an edge view of the rear plate and parts of the carriage, the connecting-pieces being in section. Fig. 5 is an inverted plan of the rear plate of the carriage shown in Fig. 3, with the triangles in position for work. Fig. 6 is a section at the line $yy$, Fig. 3. Fig. 7 is a detached view of one of the cam-stocks and part of the guide-bar. Fig. 8 is a plan of the mechanism for moving one of the beds longitudinally. Fig. 9 is a section at the line $zz$, Fig. 8. Fig. 10 is an elevation of the adjustable connection between the carriage and the driving-shaft. Fig. 11 is a separate view of the friction device connected with the yarn-carrier. Fig. 12 is an inverted plan showing the mechanism for moving the front needle-bed laterally. Figs. 13, 14, and 15 show a modification of a device for moving the lock-triangles.

A suitable stand B is provided that is capable of being clamped or otherwise fastened to a suitable table or support, and the end portions of the stand are triangular and receive upon them the needle-beds A A', the surfaces of which are grooved, as usual, for the reception of the knitting-needles, having hooked points and swinging latches, as usual in knitting-machines, and the two needle-beds are at right angles, or nearly so, to each other, the ends of the needles being adjacent to each other.

The construction of the machine is such that a tubular fabric can be knitted, the yarn passing along in the hooks of one row of needles in one direction and in the other row of needles in the other direction, or a straight fabric can be knitted upon one row of needles by the yarn being passed back and forth on that row of needles, or any other character of knitting can be performed, as usual in machines of this class.

The needle-bed A' is supported upon the stand B by guide-blocks 1, fitting within openings in said bed that are longer than the blocks in a direction at right angles to the needles, in order that the needle-bed A' may be moved endwise, which motion is effected by the hand-lever 2, provided with a shaft passing through a projection at one side of the stand B and having a cam S connected with the axis of said hand-lever 2, which cam S acts against rollers $ss'$, fastened to the under side of a projection S' at the end of the needle-bar A'. (See Figs. 8 and 9.) The cam fills the space between the rolls $ss'$ when in either position. Hence it holds the bed A' with its needles either in line with the needles in the bed A or between them. The object of moving the bed A' endwise of the machine is to change the positions of the needles of the bed A' in relation to the needles of the bed A, as required for different kinds of knitting. By this device the relative positions of the points of the needles can be determined. The bed A has slots parallel with the needles and receiving guide-blocks 3, and there is a longitudinal bar 4, Fig. 12, having cam-slots 44 receiving pins 54 upon the needle-bed A, and this longitudinal bar is moved by a lever 5, so that the needle-bed A' can be moved up or down the inclines of the stand B to bring it into proximity at its upper edge with the bed A' or to increase the distance between them.

The needle-beds A A' are channeled with parallel grooves at the proper distances apart for the reception of the needles, and each needle is made with an angular bent portion to be acted upon by the lock-triangles that give motion to the needles, as hereinafter described, and the lower ends of the needles are slightly curved, and there is at the lower end of each needle-groove a spring O, preferably bent in the form of a clip, one arm of which passes beneath the needle-bed and the other arm of which is in the needle-groove, and the ends of these springs are in such positions as to form stops to prevent the needles sliding down too far in the grooves of the needle-bed; but the ends of the springs and the ends of the needles are sufficiently inclined for the ends of the needles to be forced in under the springs whenever the needles are to be thrown out of action, as shown in Fig. 1, and when this takes place the springs hold the needles with sufficient firmness to prevent their being moved accidentally up into a position for use. These springs for the needles form one of the advantageous features of the present invention.

The needle-beds A A' are channeled longitudinally and at right angles to the needle-grooves for the reception of the bars $C^2$ $C^3$, which have dovetailed edges, and they serve to keep the needles in their positions within the grooves of the needle-beds.

The traveling carriage is made of two plates C C', set at an inclination one to the other and united by the cross-pieces 6, and the lower edge of the plate C is received into and guided by the grooved bar D, that is attached to the stand B, and the lower edge of the plate C' is received into the grooved bar D', similarly attached. This carriage, composed of the plates C C', is adapted to be moved freely backward and forward by the action of a crank L. The flanges V slide in the grooves V'. This crank L is preferably made adjustable, so as to vary the amount of motion given to the carriage, and with this object in view I provide a shaft L' in the stand B, having a head $L^2$, that is mortised for the reception of the crank L, so that said crank L can be slipped endwise through the head and held at any desired point by suitable means, such as a spring-actuated pin N, and it is preferable to provide holes $l$ in the crank L, so that the length of such crank can be determined according to the number of stitches in the knitting. There is a connecting-rod $L^3$ extending from the crank to an arm M upon the plate C of the carriage. It is advantageous to provide a handle 7, extending out beyond the crank L, to increase the leverage, as shown in Fig. 2.

Upon the guide-bars D D' are the adjustable stocks I I', having triangular cams K, set in reverse directions upon the respective stocks. These stocks can be moved along upon the respective bars D D' to any desired positions, and they determine the points at which the knitting operations begin and cease. These stocks may be held in position upon the guide-bars D D' by clamping-screws; but I prefer pins 8 with springs 88, Fig. 7, the ends of the pins being forced into holes 89 in the guide-bars, such holes being located with reference to the needles, so as to knit the proper number of stitches. There are slides E E' upon the center portions of the plates C C', respectively, and these slides E E' are guided between ribs upon the top surfaces of the plates C C', which ribs form guides at each side of such slides E E', and there is a cap-plate over each slide, as usual, and friction-springs are applied to retain the slides in either position in which they may be placed, there being preferably a pin at the end of each spring pressing against the edge of the slide, such springs being shown at 14, and the slides are connected to the middle triangle of each set of cams, and the lower ends of the slides E E' are provided with downwardly-projecting cam-pieces H, which are preferably tapering at the respective ends or elliptical in form, so as to be acted upon by the cams K. Such cams H might be replaced by pins or rollers, if desired.

Upon the under faces of the plates C C' are the triangles X, which, in connection with the middle lock-triangles G, form the cams for moving the needles up into position and drawing them back into the respective needle-beds, as usual in knitting-machines. These triangles X are adjusted as hereinafter described, and it is to be understood that with the arrangement shown in the drawings when the carriage is going in one direction the triangle G is drawn down, so that the needles will be raised and their hooks be in position for receiving the yarn, and when the carriage reaches the end of its movement in one direction the lock-triangle is raised by the action of one of the cams K, so that such triangle G does not act upon the needles during the return movement until the slide E or E' is drawn down at the end of the movement in the other direction. The cams K, that act upon the slide E, stand in the reverse positions to the cams that act upon the slide E', so that the knitting is performed with the needles upon the bed A' as the carriage goes one way and upon the bed A as the carriage goes the other way.

The triangular cams X are connected to the respective plates C C' in any suitable manner, so that they may be adjusted to give the required downward movements to the knitting-needles. I have shown such cams X as provided with studs passing into diagonal slots or channels in the respective plates C C', which are preferably undercut or dovetailed recesses receiving the heads of the studs, and each triangular cam X has a horizontal slot for the reception of an eccentric-pin $t$ upon a cylinder T, and there is a central stud on the cylinder, projecting through a plate $u$ and an index-pointer, and the stud is squared for the reception of the head T', by which the cylinder, the pointer, and the eccentric-pin may be turned for adjusting the position of the triangular cam, and the nut U' on the screw-threaded end of the stem is used to clamp the parts in position after adjustment. By these devices applied to each of the triangles X their positions can be easily determined, so as to vary the tightness of the stitches in the knitting operation.

The yarn passes from any suitable spool through the yarn-carrier P, which is in the form of an eye at the end of a bent arm pivoted at P' upon the cap-plate that is over the slide E', and this yarn-carrier is free to swing upon the pivot P' beneath the bridge $q$ and between the lugs to which the bridge is secured by the screws $p$, and the amount of motion of the yarn-carrier is sufficient to bring the yarn at the proper place for passing into the hooks of the needles, and in order to insure a detention of the yarn-carrier P at the beginning of the movement in either direction I make use of a friction device $R^2$, connected with the yarn-carrier and pressing against a rib upon the needle-bar $C^3$. This friction device is in the form of a stud R, passing down from the yarn-carrier and having a spring $R^3$ around it for pressing the friction device $R^2$ against the upper surface of such rib. Hence at the end of the movement in one direction the friction device holds the yarn-carrier until the carriage has moved a sufficient distance for one of the lugs at $p$ to come into contact with the yarn-carrier and give motion to the same in the opposite direction. I employ a yarn-stretcher $P^4$, formed of a spring-wire coiled around the axis $P^3$ upon the bracket $P^2$, and the free end of this yarn-stretcher is made as an eye through which the yarn passes, and there is a hook Q, beneath which the yarn-stretcher is drawn by the tension of the yarn, and this yarn-stretcher is held by said hook until the parts complete their movement in one direction, and as the carriage commences to move in the opposite direction and the yarn-carrier P to swing the lever Q' is acted upon by the stop $q'$ upon the bridge $q$, and it presses the yarn-stretcher $P^4$ from beneath the hook Q, and the spring of the wire composing such yarn-stretcher causes the moving end of such yarn-stretcher to rise and take up any loose yarn, and as the yarn is drawn off during the movement in the opposite direction the tension of the yarn draws this stretcher down and it is again caught beneath the hook Q. This device tends to lessen the risk of the yarn's becoming entangled.

In cases where it is desired to bring into action the needles every second movement of the carriage I substitute for the stocks I I', with their cams K, the device represented in Figs. 13, 14, and 15, in which there is a lever $c$ pivoted upon the stock $a$ at $b$, and there is a second lever $f$ pivoted at 9 upon the stock $a$ and connected by a link $d$ and pivots $e$ and $i$ to the lever $c$, and there is a spring $h$ bearing against one end of the bent lever $f$ and as the carriage is moved in one direction the cam or pin H upon the slide E or E' comes in contact with the inclined surface of the lever $c$ when in the position shown by full lines, and by such lever $c$ the cam H, slide E, and triangle G are moved upwardly, and as the cam H passes the pivot $b$ it depresses the joint $i$ until such joint $i$ is carried beyond a straight line between the pivots $e$ and $b$, and the spring $h$ and lever $f$ throw the lever $c$ and link $d$ into the position represented by dotted lines, and as the cam returns in the opposite direction and the cam or pin H presses down the upper end of the lever $c$ it does not move the same sufficiently far to cause its restoration to the position represented by full lines, and the parts spring back into the position shown by dotted lines; and when the carriage is passing along the second time the cam H runs under the lever $c$, and such cam H, the slide, and the lock-triangle are brought down into position for acting upon the needles, and in so doing the cam or roller H, under running the lever $c$ as it occupies the dotted position, raises the joint $i$ sufficiently high for it to pass beyond a straight line between $b$ and $e$, and the spring $h$, lever $f$, and link $d$ return the lever $c$ into the position shown by full lines to act in the manner before mentioned.

It is to be understood that the devices shown in Figs. 13, 14, and 15 are to be upon the guide-bar D or D' in a position to act at the end of the stroke in either one direction or the other.

The mode of adjustment of the machine and the operations of the respective parts in performing the different characters of knitting will be apparent to those familiar with this class of machinery.

I claim as my invention—

1. The combination, in a knitting-machine, of the needle-beds A A', grooved for the reception of the needles, the springs O within the lower ends of the needle-grooves, and the needles having offsets to be acted upon by the cams and their lower ends adapted to be passed in beneath the springs to retain such knitting-needles when out of action, substantially as set forth.

2. The combination, with the carriage and the yarn-carrier, of a spring yarn-stretcher and a hook beneath which the yarn-stretcher is drawn by the action of the yarn, substantially as set forth.

3. The combination, with the carriage in a knitting-machine, of a yarn-carrier, a pivot for connecting the yarn-carrier to the carriage, a needle-bar having a flange, a bridge beneath which the yarn-carrier swings, and a frictional device connected with the yarn-carrier and pressed against the needle-bar flange and serving as a drag to bring the yarn-carrier into position as the carriage commences its movement, substantially as set forth.

4. The combination, in a knitting-machine, of two needle-beds A A', a stand for supporting the same, a handle and cam, and a connection from the cam to the needle-bed A' for communicating to such needle-bed an endwise movement, substantially as set forth.

5. The combination, in a knitting-machine, of the carriage with plates C C', the guide-bars grooved for the reception of the edges of such plates, the slides E E' upon such carriage, the lock-cams connected with the slides, the projections or cams upon such slides, the stocks movable lengthwise upon the guide-bars, and the cams carried by such stocks, substantially as set forth.

In witness whereof I have hereunto signed my name in the presence of two subscribing witnesses.

PER PERSSON OLSSON.

Witnesses:
NERE A. ELFWING,
E. H. BRUHN.